United States Patent [19]

Akano

[11] Patent Number: 4,633,217

[45] Date of Patent: Dec. 30, 1986

[54] COMMUNICATION APPARATUS

[75] Inventor: Shinichi Akano, Shibuya, Japan

[73] Assignee: Yamatake Honeywell, Tokyo, Japan

[21] Appl. No.: 736,923

[22] Filed: May 22, 1985

[30] Foreign Application Priority Data

Jun. 4, 1984 [JP] Japan ................................ 59-113010

Sep. 12, 1984 [JP] Japan ................................ 59-189706

[51] Int. Cl.[4] ............................................ H04M 11/04

[52] U.S. Cl. ............................ 340/310 A; 340/870.39

[58] Field of Search .......... 340/310 A, 310 R, 870.39; 179/81 R, 16 F

[56] References Cited

U.S. PATENT DOCUMENTS 4,190,822 2/1980 Swarbrick ...................... 340/870.39

4,400,588 8/1983 Stobbs et al. ..................... 179/81 R

*Primary Examiner*—John W. Caldwell, Sr.

*Assistant Examiner*—David A. Okonsky

*Attorney, Agent, or Firm*—Trevor B. Joike

[57] ABSTRACT

A communication apparatus for receiving both power and a sensor signal over the same transmission line having a first variable impedance element and a receiving impedance element connected in series across the transmission line, a second variable impedance element and a series impedance element connected in series across the transmission line, and a control circuit for controlling the first variable impedance element to maintain the transmission line voltage constant and for controlling the second variable impedance element to maintain the current flowing through the series impedance element constant, the control circuit simultaneously controlling the first and second variable impedance elements to maintain the current flowing through the series impedance element constant while transmitting data over the transmission line.

21 Claims, 8 Drawing Figures

Fig. 1
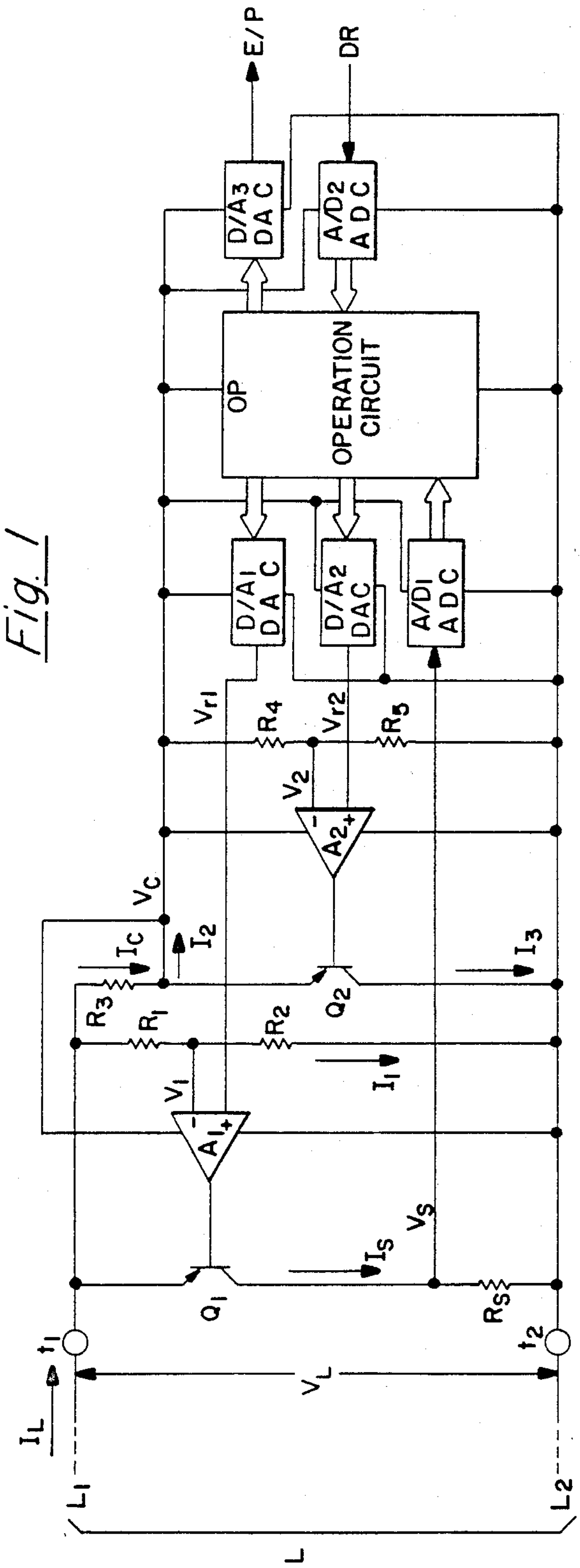
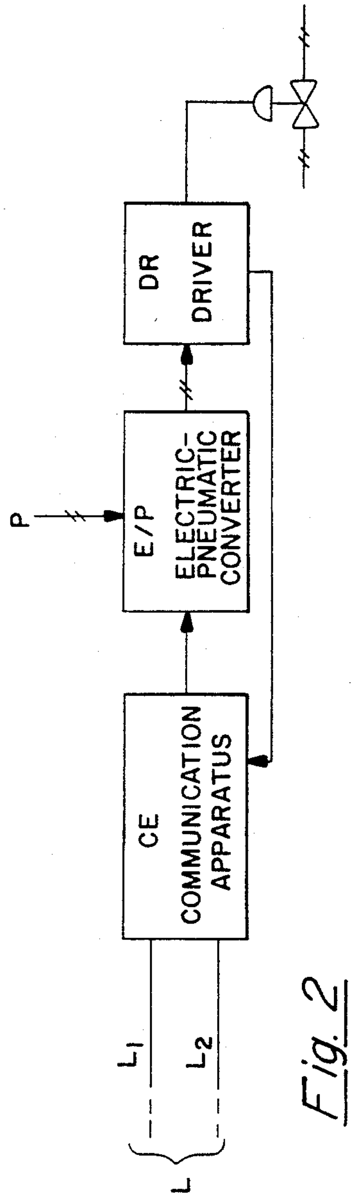
Fig. 2

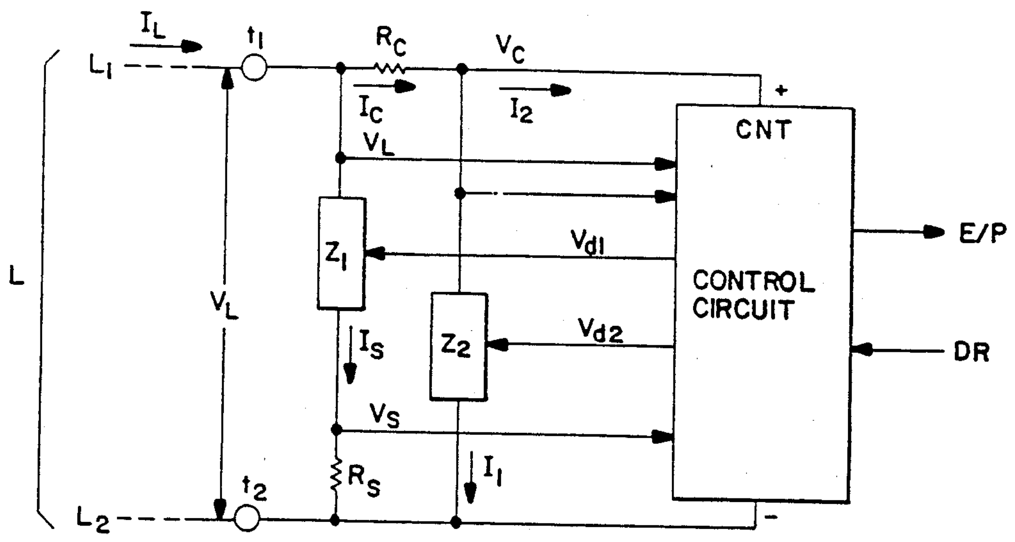
$Z_1$, $Z_2$: VARIABLE IMPEDANCE ELEMENT
$R_S$, $R_C$: RESISTOR (IMPEDANCE ELEMENT)
*Fig. 3*
*Fig. 4*
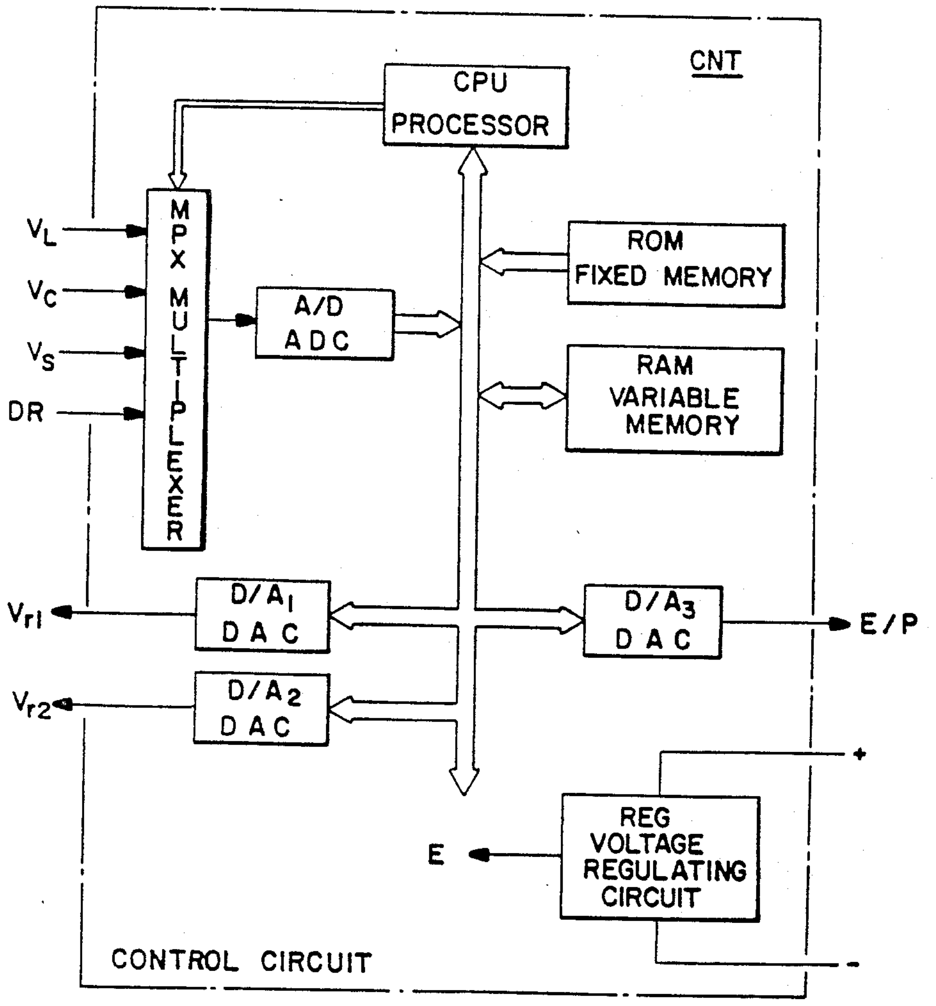

COMMUNICATION APPARATUS

BACKGROUND OF THE INVENTION

The present invention relates to a communication apparatus which receives, in an industrial process for example, a current signal flowing through a 2-wire system transmission line to control such loads as valves, etc. and which transmits a signal indicating a control condition, etc. by changing an in-line voltage of the transmission line.

In industrial processes, a receiving apparatus called a positioner is generally provided for remotely controlling valves, etc. But in the case of such field apparatus, a signal is transmitted from the central control unit by a current value which changes in the range, for example, of 4–20 mA and this signal is received by the receiving apparatus. Thereby, controls are carried out in accordance with a current value.

However, the apparatus of the prior art has the disadvantage that a 2-wire system transmission line is required for transmission of a current value indicating the signal and simultaneously another 2-wire system transmission line is also required in order to supply the required power to the receiving apparatus. Namely, a 4-wire system transmission line is essential. Thus, the required amount of wire material for the transmission line and the man-hours for wiring increase and the facility cost also becomes high.

The prior art also has the disadvantage that an additional transmitting apparatus is required and it must be connected with the control unit by an exclusive transmission line in order to monitor the control and operating conditions of valves, etc. and thereby an uneconomical investment is required.

SUMMARY OF THE INVENTION

Thus, a signal value which changes, for example, in the range of 0–16 mA is extracted by a communication apparatus from a current which flows through a 2-wire system transmission line, this current changing in the range of 4–20 mA, so that a bias component of 4 mA can be extracted for use as the local power supply and meanwhile transmission by the communication apparatus is carried out through the change of the in-line voltage of the transmission line.

The present invention has an object to essentially solve the disadvantages of the prior art. Moreover, in a system where a combined signal of 4–20 mA according to one example of the present invention contains a numerical signal component in the range from 0 to 16 mA and contains a bias component of 4 mA, such a system according to the present invention includes a series arrangement of a first variable impedance element and a receiving impedance element connected across the 2-wire system transmission line, the impedance of the first variable impedance element being controlled in such a direction as to stabilize an in-line voltage of the transmission line, a series circuit of a series impedance element and a second variable impedance element connected in parallel to such elements, the current through the series impedance element being controlled in such a direction as to keep it to a constant value in accordance with the bias component, and a load circuit connected in parallel to the second variable impedance elment, wherein the bias component is used as the power supply and the in-line voltage is changed in accordance with a transmitting signal while a current of the series impedance element is kept constant so that transmission is thereby carried out, and power is supplied only by the 2-wire system transmission line and simultaneously the transmitting/receiving function is also provided.

Alternatively, a first variable impedance element and a receiving impedance element are inserted in series across the 2-wire system transmission line, the impedance of a variable impedance element being controlled in such a direction as to stabilize an in-line voltage of the transmission line, a series circuit of a series impedance element and a second variable impedance element is connected in parallel to the receiving impedance element and the first variable impedance element, a current flowing into the series impedance element being controlled in such a direction as to keep it constant in accordance with a bias component, and simultaneously an in-line voltage is changed in accordance with a transmitting signal while a current applied to the series impedance is kept constant, whereby the signal is transmitted and such controls are provided under control of a single control circuit. Only a current indicating a signal value is applied to the receiving impedance element and thereby a signal can be received, and simultaneously, a signal can be transmitted by changing the in-line voltage responsive to the transmitting signal. Accordingly, reception of a current value and transmision by in-line voltage can be realized freely and, meanwhile, a local power supply current can be obtained freely within the range of the bias component which is applied to the series impedance element.

BRIEF DESCRIPTION OF THE DRAWINGS

The present invention is explained in detail with reference to the drawings indicating the embodiment thereof in which:

FIG. 1 is a schematic diagram of one form of the invention;

FIG. 2 shows an arrangement in which the communication apparatus of FIG. 1 can be used;

FIG. 3 shows an alternative form of the invention;

FIG. 4 shows a block diagram of control circuit CNT;

DETAILED DESCRIPTION

Figure 5:
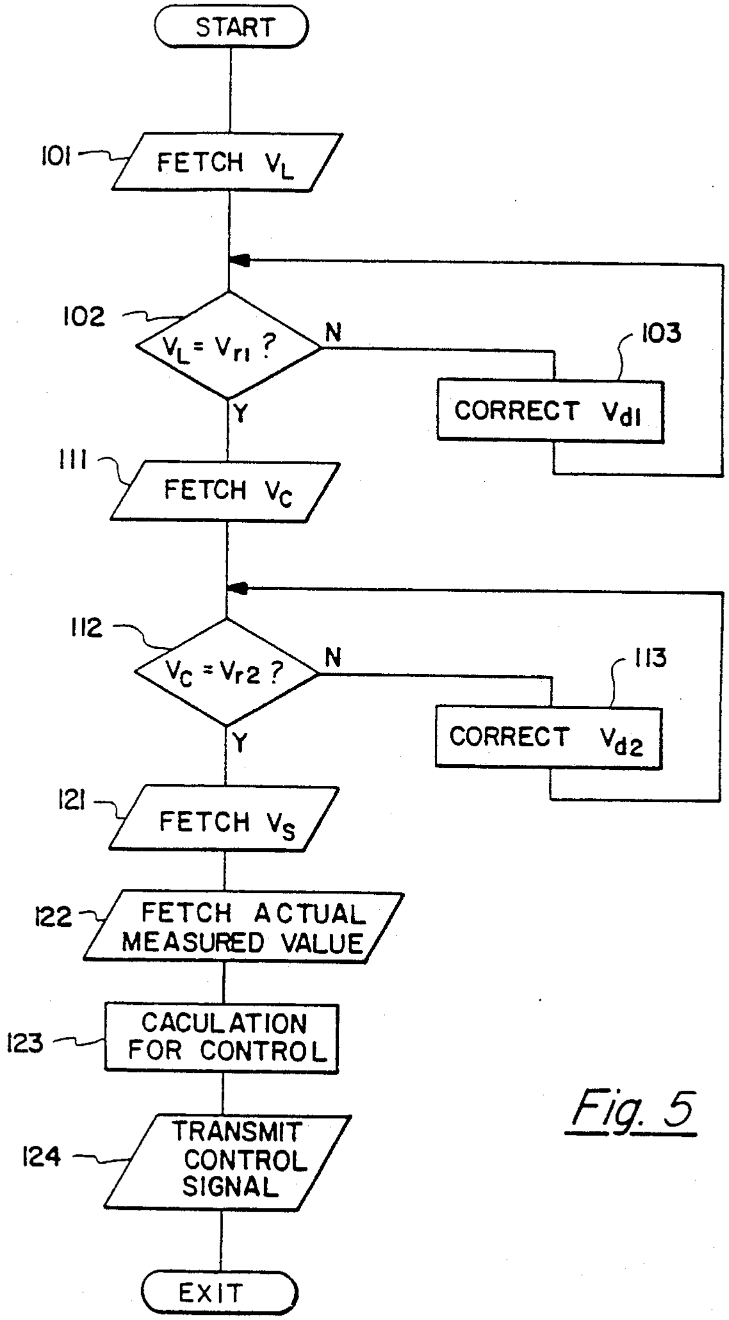
FIG. 5 is a flow chart showing the operating procedures for receiving data.

FIG. 1 is a schematic diagram, wherein the 2-wire system transmission line L connected through the line terminals $t_1$, $t_2$ is composed of the lines $L_1$ and $L_2$. A control unit also connected to line L transmits power and control information to the communication apparatus CE of FIG. 1 and communication apparatus CE transmits monitor information back to the control unit (not shown). A first variable impedance element in the form of a transistor $Q_1$ has its emitter connected to terminal $t_1$ and its collector connected to a receiving impedance element in the form of resistor $R_s$ the other side of which is connected to terminal $t_2$. Meanwhile, a voltage dividing circuit consisting of resistors $R_1$ and $R_2$ is connected in parallel to $Q_1$ and $R_s$, and a resistor $R_3$ as the series impedance element is connected between terminal $t_1$ and the emitter of transistor $Q_2$ the collector of which is connected to terminal $t_2$. Transistor $Q_2$ is used as a second variable impedance element.

Moreover, in parallel to the transistor $Q_2$ is a voltage dividing circuit consisting of resistors $R_4$, $R_5$. Also present in the circuit of FIG. 1 are differential amplifiers $A_1$, $A_2$, digital-to-analog converters (hereinafter referred to as DAC) $D/A_1$-$D/A_3$, analog-to-digital converters (hereinafter referred to as ADC) $A/D_1$, $A/D_2$, and an operation circuit OP consisting of a microprocessor and memory, etc. connected as a load circuit, the operation circuit OP transmitting the reference voltages $V_{r1}$, $V_{r2}$ through DAC $D/A_1$, $D/A_2$.

Here, the resistors $R_1$, $R_2$ and differential amplifier $A_1$ form the first control circuit and controls the impedance of transistor $Q_1$ in a direction to stabilize an in-line voltage $V_L$ in accordance with a sample of voltage $V_L$ of transmission line L as supplied by the resistors $R_1$, $R_2$, using as a reference the voltage $V_{r1}$ supplied from DAC $D/A_1$. Thereby, in-line voltage $V_L$ is kept to a constant value, for example, of 10V, without relation to a value of line current $I_L$.

The resistors $R_4$, $R_5$ and differential amplifier $A_2$ form the second control circuit and controls the impedance of transistor $Q_2$ in such a direction as to stabilize a value of current $I_c$ applied to the resistor $R_3$ in accordance with a voltage $V_2$ obtained by dividing a load circuit voltage $V_c$ of resistor $R_3$ with the resistors $R_4$, $R_5$ on the basis of the reference voltage $V_{r2}$ supplied from DAC $D/A_2$. Thereby, current $I_c$ is kept to a constant value, for example, of 4 mA without relation to a power supply current of each load circuit.

Therefore, if the resistors $R_1$, $R_2$ have high resistance values and current $I_1$ flowing therethrough can be neglected, current $I_s$ flowing into the resistor $R_s$ can be indicated as $I_s=I_L-I_c$. Where the current $I_c$ is determined equal to the bias component, $I_s$ is formed, for example, by the signal component of 0–16 mA and, therefore, terminal voltage $V_s$ of resistor $R_s$ is converted to a digital signal by ADC $A/D_1$ and it is applied to the operation circuit OP as a setting value. Simultaneously, where an actually measured value sent from the drive unit DR described later is applied to the operation circuit OP after it is converted by ADC $A/D_2$, the same circuit OP sends a control signal by the control operation, which control signal is converted into an analog signal by DAC $D/A_3$ and is given to the electrical/pneumatic converter E/P for controlling the opening of the valve. In this case, opening of the valve is set under the condition that the present value matches the actually measured value.

In FIG. 1, since negative feedback is used for the differential amplifiers $A_1$, $A_2$ and since therefore $V_1=V_{r1}$, $V_2=V_{r2}$, the following relationship can be obtained:

$$V_1=V_L[R_2/(R_1+R_2)]=V_{r1}$$

$$V_L=V_{r1}[1+(R_1/R_2)] \quad (1)$$

$$V_2=V_C[R_5/(R_4+R_5)]=V_{r2}$$

$$V_C=V_{r2}[1+(R_4/R_5)] \quad (2)$$

Here, since $V_{r1}$, $V_{r2}$ are stabilized so long as the data sent from the operation circuit OP is constant, $V_L$ and $V_C$ are also constant and the following relation can be obtained:

$$I_C=(V_L-V_C)/R_3 \quad (3)$$

Namely, $I_C$ becomes constant. Meanwhile, a line current $I_L$ can be expressed by the following equation:

$$I_L=I_1+I_2+I_3+I_s=I_1+I_C+I_s \quad (4)$$

If $I_1=O$, then $$I_s=I_L-I_C \quad (5)$$

Therefore, when $I_L$ is for example 4–20 mA, $I_s=0$–16 mA by setting $I_C$ to 4 mA. Namely, the signal component of line signal current $I_L$ is indicated by $I_s$ and bias component $I_C$ of signal current $I_L$ provides a power supply current with a maximum of 4 mA to stably supply the circuit of FIG. 1 with power.

A control unit (not shown) supplies line current $I_L$ by a constant current circuit and the current value thereof is not influenced even when the input impedance of the receiving apparatus changes.

Meanwhile, in the case of transmitting an actually measured value to the control unit, since the operation circuit OP supplies the data to be sent through DAC $D/A_1$, $D/A_2$, as by pulses, under the condition that the reference voltages $V_{r1}$, $V_{r2}$ are changed in such a way that the in-line voltage $V_L$ is pulsed so that transmission is carried out and an actual measured value is indicated by pulse code while at the same time the current $I_C$ is kept constant in accordance with the sensing signal. However, such in-line voltage can also be changed in an analog manner and the signal can be transmitted thereby.

Namely, the current $I_C$ can be kept constant by maintaining the numerator of the equation (3) at a constant value and, when $V_L-V_C=V_R$, the following relationship can be obtained from equations (1) and (2):

$$V_L-V_C=V_R=V_{r1}[1+(R_1/R_2)]-V_{r2}[1+(R_4/R_5)]$$

$$V_{r2}=[V_{r1}\{1+(R_1/R_2)\}-V_R][1/\{1+(R_4/R_5)\}] \quad (6)$$

Here if the following relationship exists, $$R_2/(R_1+R_2)=R_5/(R_4+R_5)=K \quad (7)$$

then the following relationship can be obtained from equations (6) and (7):

$$V_{r2}=[V_{r1}(1/K)-V_R]K=V_{r1}-V_R K \quad (8)$$

Therefore, if data to be sent to ADC $A/D_1$, $A/D_2$ are changed simultaneously while the relationship of equation (8) is maintained, in-line voltage $V_L$ can be freely increased or decreased according to the pulses to be transmitted while the current $I_C$ is maintained, for example, at 4 mA so that data can be transmitted by voltage changes during reception of a current value.

At the control unit, the in-line voltage is compared with a specified reference voltage and only a change is extracted and decoded. In the case where in-line voltage $V_L$ is changd in an analog manner, a signal can be received simultaneously with transmission by a current value with the means for extracting a change of such analog signal.

In case a change of voltage $V_C$ affects operation of the load circuit, it is required only that a voltage stabilizing circuit be inserted to that part of the circuit where current $I_2$ flows and resistors $R_4$, $R_5$ are connected to the input side thereof.

FIG. 2 is a block diagram indicating an example of an arrangement in which the communication apparatus of the present invention such as shown in FIG. 1 can be used. A receiving output from the communication apparatus CE shown in FIG. 1 is supplied to the electric-pneumatic converter E/P. A pneumatic pressure P becomes a pressure in accordance with the receiving output and is sent to a driver DR such as an air cylinder, which drives a valve V controlling the opening thereof. Simultaneously, a current opening is detected as an actually measured value by a potentiometer connected to the drive shaft and is sent to the communication apparatus CE.

Therefore, power is supplied from a control unit only by the 2-wire system transmission line L and the monitor data can also be transmitted by the communication apparatus CE to the control unit. As a result, the required amount of wire materials and man-hours for wiring can be reduced remarkably and the facility cost can also be reduced because an additional transmission apparatus is not required.

Here, in FIG. 1, the transistors $Q_1$, $Q_2$ may be replaced with other controllable variable impedance elements such as a field effect transistor or a photocoupler, the same effect can also be obtained by a circuit arrangement where an input signal is not converted to a voltage by a resistor $R_s$ and a current value is directly read, or the resistor $R_3$ is replaced with a variable impedance element such as a constant current diode. Moreover, it is also possible to generate the reference voltages $V_{r1}$, $V_{r2}$ by a constant voltage diode in place of DAC $D/A_1$, $D/A_2$ and select such voltages for the transmission. The operation circuit OP can be formed through a combination of various logic circuits or by analog circuits and thereby DAC $D/A_1$–$D/A_3$ and ADC $A/D_1$, $A/D_2$ can be omitted.

As a line current, a bias component is determined in accordance with the required power supply current of a load circuit and a motor can be used as a load circuit.

In FIG. 2, a motor may be used as a driver and it is also adopted when a dumper and a pump are used as the control object in addition to a valve V. The present invention allows such various modifications that a temperature sensor and a vibration sensor which detects a leakage sound of fluid is provided, such detected output is applied to the communication apparatus CE and it can be transmitted as the monitor information.

Shown in FIG. 3 is a block diagram indicating an alternative communication apparatus which can communicate with a control unit over transmission line L. The 2-wire system transmission line L connected through the line terminals $t_1$, $t_2$ is composed of the lines $L_1$, $L_2$. Moreover, a first variable impedance element (hereinafter referred to as element) $Z_1$ has one side connected to terminal $t_1$ and its other side connected to resistor $R_s$, the receiving impedance element, the other side of which is connected to terminal $t_2$. Also, a series circuit of resistor $R_C$, the series impedance element, and a second variable impedance element $Z_2$ is connected in parallel to said elements $Z_1$ and $R_s$.

Moreover, a control circuit CNT is connected in parallel to the element $Z_2$ as the power supply and load. The same circuit CNT is given an in-line voltage $V_L$ with reference to the side of line terminal $t_2$, a load side voltage $V_C$ of resistor $R_C$, a terminal voltage $V_s$ of resistor $R_s$ and an actually measured value sent from a driver DR described later. The control circuit CNT sends the first and second control voltages $V_{d1}$, $V_{d2}$ in accordance with the voltages $V_L$, $V_C$. The impedances of elements $Z_1$ and $Z_2$ are controlled and thereby a voltage $V_L$ is kept to a constant value, for example, of 10V while a voltage $V_C$ is kept to a constant value, for example, of 7V. Simultaneously, the control calculation is carried out responding to a received value based on the voltage $V_s$ and an actual measured value sent from the driver DR and thereby a control signal is sent to the electric-pneumatic converter E/P shown in FIG. 2.

Here, a current $I_C$ flowing into a resistor $R_C$ is expressed by the following equation:

$$I_C=(V_L-V_C)/R_C \tag{9}$$

Therefore, the current $I_C$ becomes constant without relation to a load current $I_2$ by controlling the impedance of element $Z_1$ in such a direction as to stabilize $V_L$, controlling the impedance of element $Z_2$ in such a direction as to stabilize $V_C$, and adjusting a current $I_1$ applied thereto, and the following equation can be obtained:

$$I_L=I_s+I_1+I_2=I_s+I_C$$

$$I_s=I_L-I_C \tag{10}$$

Namely, when $I_C$ is determined equal to the bias component, the current $I_s$ applied to the resistor $R_s$ is composed of only the signal component of 0–16 mA in case where the line current $I_L$ is, for example, 4–20 mA and, therefore, a received value can be detected by the voltage $V_s$.

Moreover, when $I_L$ is 4–20 mA, a power supply current at a maximum of 4 mA can be derived freely.

In a control unit (not shown), a constant current circuit sends line current $I_L$ and any influence is not applied to a current value even when an input impedance in the receiving side changes.

When it is required to send an actually measured value to the control unit, while the current $I_C$ is kept constant in accordance with a sending signal, the control voltages $V_{d1}$, $V_{d2}$ are changed simultaneously, as by a pulse or in an analog manner. Thereby, the in-line voltage $V_L$ changes and the signal can be transmitted.

Accordingly, for example, if the voltage $V_L$ is increased or decreased while the current $I_C$ is kept at 4 mA, transmission by voltage change can be realized during reception of a current signal.

In the control unit, the signal voltage reception can be realized simultaneously with transmission of a current signal by means which compares the in-line voltage with the specified reference voltage to extract the data transmitted by the communication apparatus and to then decode such signal component.

Moreover, if a change of voltage $V_C$ affects operation of the load circuit, it is required only to insert a voltage stabilizing circuit to that part of the circuit where the current $I_2$ flows.

For the elements $Z_1$, $Z_2$, those which are controllable and have a variable impedance such as transistors or photocouplers may be used.

FIG. 4 shows a block diagram of control circuit CNT wherein a fixed memory ROM, a variable memory RAM, an analog-to-digital converter (ADC) A/D, and digital-to-analog converters (DAC) $D/A_1$–$D/A_3$ are arranged around a processor CPU, such as a microprocessor, these being interconnected by a bus. The processor CPU executes the instructions in the fixed memory ROM, and the control operation can be realized while making access to the variable memory RAM with the specified data.

The voltage $V_C$ shown in FIG. 1 is stabilized in the voltage regulator REG and it is then supplied to each part as the local power supply E.

Meanwhile, a multiplexer MPX which is controlled by the processor CPU is provided at the input side of ADC A/D and thereby voltages $V_L$, $V_C$, $V_S$ and actual measured value DR sent from the driver DR are then selected, and repeatedly and individually converted to digital signals by ADC A/D and thereafter supplied to the processor CPU, which applies the control data to DAC $D/A_1$-$D/A_3$ in accordance with such digital signals. Accordingly, the control voltages $V_{d1}$, $V_{d2}$ are converted to analog signals and the control signal is transmitted to the electric-pneumatic converter E/P.

FIG. 5 shows a flow chart of control procedures followed by the processor CPU. Voltage $V_L$ is fetched at "101" through multiplexer MPX and ADC A/D. It is then determined if $V_L = V_{r1}$ at "102" through comparison with the first reference voltage $V_{r1}$ stored previously in the fixed memory ROM. If $V_L \neq V_{r1}$ control voltage $V_{d1}$ is corrected at "103" in accordance with $V_L$, and such processes are repeated until $V_L = V_{r1}$.

Thereafter, voltage $V_C$ is fetched at "111" as in the case of step 101. It is then determined if $V_C = V_{r2}$ at "112" through comparison with the second reference $V_{r2}$ as in the case of step 102. If $V_C \neq V_{r2}$, control voltage $V_{d2}$ is corrected at "113" until $V_C = V_{r2}$ as in the case of step "103".

After $V_L$ and $V_C$ are kept constant by the above procedures, the voltage $V_s$ is fetched at "121" as in the case of step "101", an actual measured value is then fetched at "122" from the driver DR, calculations for control are conducted as "123" in accordance with such values and the control signal is supplied at "124" through the DAC $D/A_3$.

Figure 6:
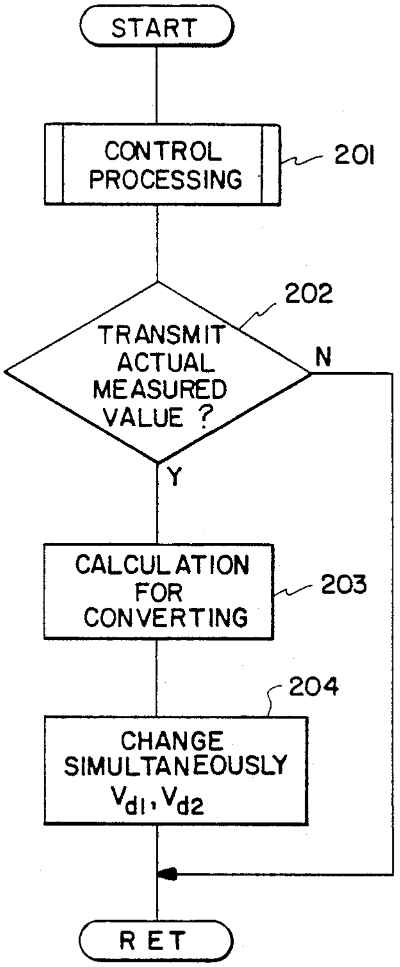
FIG. 6 is a flow chart showing the operating procedures for transmitting data; and, FIGS. 7 and 8 show other embodiments of the apparatus of FIG. 3.

FIG. 6 is a flow chart of transmission control. After the control processing shown in FIG. 5 is conducted at "201", it is next determined whether the actual measured value is to be transmitted or not in the step for judging whether actual measured value should be transmitted at "202". If a measured value is to be transmitted, calculation for converting the data to be transmitted is carried out at "203" and thereafter the control voltages $V_{d1}$, $V_{d2}$ are changed simultaneously at "204" so that the current $I_C$ does not change and thereby transmission is carried out and the step 201 and successive steps are repeated.

The receiving output from the communication apparatus CE shown in FIG. 1 is given to the electric-pneumatic converter E/P of FIG. 2 and herein a pneumatic pressure P becomes a pressure in accordance with a receiving output and is then sent to a driver DR such as an air cylinder. This cylinder drive a valve V and controls the opening of it. Moreover, a current opening is detected as the actual measured value by a potentiometer coupled to the drive shaft and such value is sent to the communication apparatus CE.

Figure 7:
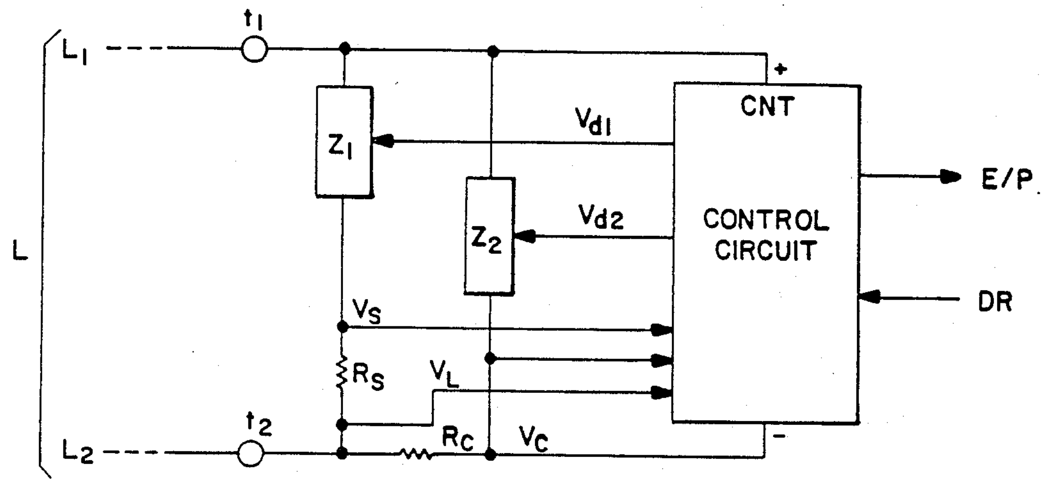
Figure 8:
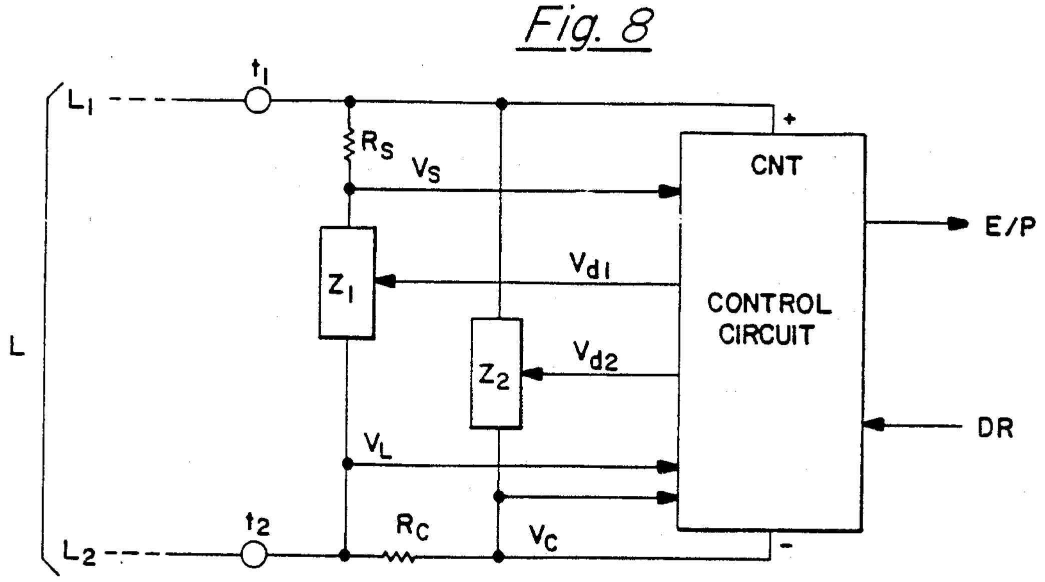

FIGS. 7 and 8 are block diagrams similar to FIG. 1 indicating other embodiments. In FIG. 7, a resistor $R_C$ is inserted to the side of line terminal $t_2$, while in FIG. 8 a resistor $R_s$ is inserted to the side of line terminal $t_1$. Other components are similar to those of FIG. 3.

The control circuit CNT is required to select the detection reference voltage of respective voltages in accordance with the locations of the resistors $R_s$ and $R_C$ and, therefore, it is enough to only modify the arrangement of FIG. 4 depending on such selection.

Accordingly, the transmission and reception of data in accordance with the present invention can be attained by a single control circuit CNT and since the circuit CNT is totally formed by digital circuits, control conditions are stabilized and a reduction in size can be realized easily.

Here, a resistor $R_S$ can be replaced with an impedance element such as a diode or a circuit which directly detects a current value and a resistor $R_C$ can be replaced with a constant voltage diode.

As a line current, a bias component is determined in accordance with the required power supply current of a load circuit and a motor can be used as a load circuit.

The embodiments of the invention in which an exclusive property or right is claimed are defined as follows:

1. A communication apparatus for receiving both power and a control signal over the same transmission line, the transmission line having first and second wires, and for transmitting data over said transmission line, said apparatus comprising:
- a first terminal for connection to said first wire;
- a second terminal for connection to said second wire;
- a first variable impedance element;
- a receiving impedance element;
- first connecting means for connecting said first variable impedance element and said receiving impedance element in series and to said first and second terminals;
- a second variable impedance element;
- a series impedance element;
- second connecting means for connecting said second variable impedance element and said series impedance element in series and to said first and second terminals; and,
- control circuit means connected to said first variable impedance element for controlling said first variable impedance element to stabilize a transmission line voltage across said first and second terminals to a constant value and connected to said second variable impedance element for controlling said second variable impedance element to stabilize a current flowing through said series impedance element to a constant value so that data and power can be received, said control circuit means simultaneously controlling said first and second variable impedance elements to maintain said current flowing through said series impedance element constant while transmitting data over said transmission line.

2. The apparatus of claim 1 wherein said control circuit means comprises a first differential amplifier having an output connected to said first variable impedance means and having first and second inputs, and a second differential amplifier having an output to said second variable impedance element and having first and second inputs.

3. The apparatus of claim 2 wherein said control circuit means comprises a first voltage divider having first and second resistors connected in series, means connecting said first voltage divider to said first and second terminals, said first input of said first differential amplifier being connected to a junction of said first and second resistors.

4. The apparatus of claim 3 wherein said control circuit means comprises a second voltage divider having third and fourth series connected resistors, means connecting said second voltage divider to a junction between said second variable impedance element and said series impedance element and to one of said first and second terminals, said first input of said second differential amplifier being connected to a junction between said third and fourth resistors of said second voltage divider.

5. The apparatus of claim 4 wherein said control circuit means comprises an operation circuit connected to said junction between said second variable impedance element and said series impedance element and to one of said terminals and having a first reference output connected to said second input terminal of said first differential amplifier and having a second reference output connected to said second input of said second differential amplifier.

6. The apparatus of claim 5 further comprising output means connected to said receiving impedance element for providing an indication of a signal received by said communication apparatus over said transmission line.

7. The apparatus of claim 6 wherein said operation circuit comprises input means connected to said receiving impedance element for receiving data transmitted to said communication apparatus over said transmission line.

8. The apparatus of claim 1 wherein said control circuit means comprises processor means for determining an amount by which said first and second variable impedance elements must be adjusted to maintain the voltage across said transmission line at a constant value and to maintain the current flowing through the series impedance element at a constant value.

9. The apparatus of claim 8 wherein said processor means comprises processor connecting means connected to receive a signal indicative of the voltage across said transmission line, to receive a signal indicative of a current flowing through said series impedance element, and to receive a signal indicative of the current flowing through said receiving impedance element.

10. The apparatus of claim 9 wherein said processor connecting means comprises a multiplexer.

11. The apparatus of claim 10 wherein said processor means comprises memory means for storing information used in determining a desired impedance value for said first and second variable impedance elements.

12. A communication apparatus for receiving an electrical signal over a two-wire transmission line, said electrical signal comprising a signal component and a bias component, said bias component being used by said communication apparatus for providing power to said communication apparatus, said communication apparatus also transmitting data over said two-wire transmission line, said communication apparatus comprising:

a first variable impedance element and a receiving impedance element connected in series for connection across said transmission line;

a second variable impedance element and a series impedance element connected in series for connection across said transmission line; and, control circuit means connected to said first variable impedance element for controlling the impedance of said first variable impedance element to stabilize the voltage across said transmission line to a constant value and connected to said second variable impedance element for controlling the impedance of said second variable impedance element to stabilize the current flowing through said series impedance element to a constant value whereby a current flowing through said receiving impedance element relates to said signal component and wherein a current flowing through said series impedance element relates to said bias component, said control circuit means also controlling said first and second variable impedance elements simultaneously for maintaining said current flowing through said series impedance element constant while transmitting data over said transmission line.

13. The apparatus of claim 12 wherein said control circuit means comprises a first differential amplifier having an output connected to said first variable impedance means and having first and second inputs, and a second differential amplifier having an output to said second variable impedance element and having first and second inputs.

14. The apparatus of claim 13 wherein said control circuit means comprises a first voltage divider having first and second resistors connected in series, means connecting said first voltage divider to said first and second terminals, said first input of said first differential amplifier being connected to a junction of said first and second resistors.

15. The apparatus of claim 14 wherein said control circuit means comprises a second voltage divider having third and fourth series connected resistors, means connecting said second voltage divider to a junction between said second variable impedance element and said series impedance element and to one of said first and second terminals, said first input of said second differential amplifier being connected to a junction between said third and fourth resistors of said second voltage divider.

16. The apparatus of claim 15 wherein said control circuit means comprises an operation circuit connected to said junction between said second variable impedance element and said series impedance element and to one of said terminals and having a first reference output connected to said second input terminal of said first differential amplifier and having a second reference output connected to said second input of said second differential amplifier.

17. The apparatus of claim 16 further comprising output means connected to said receiving impedance element for providing an indication of a signal received by said communication apparatus over said transmission line.

18. The apparatus of claim 12 wherein said control circuit means comprises processor means for determining an amount by which said first and second variable impedance elements must be adjusted to maintain the voltage across said transmission line at a constant value and to maintain the current flowing through the series impedance element at a constant value.

19. The apparatus of claim 18 wherein said processor means comprises processor connecting means connected to receive a signal indicative of the voltage across said transmission line, to receive a signal indicative of a current flowing through said series impedance element, and to receive a signal indicative of the current flowing through said receiving impedance element.

20. The apparatus of claim 19 wherein said processor connecting means comprises a multiplexer.

21. The apparatus of claim 20 wherein said processor means comprises memory means for storing information used in determining a desired impedance value for said first and second variable impedance elements.

* * * * *